(12) United States Patent
Mealey et al.

(10) Patent No.: US 8,943,502 B2
(45) Date of Patent: Jan. 27, 2015

(54) RETOOLING LOCK INTERFACES FOR USING A DUAL MODE READER WRITER LOCK

(75) Inventors: Bruce Mealey, Austin, TX (US); James Bernard Moody, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 12/723,719

(22) Filed: Mar. 15, 2010

(65) Prior Publication Data

US 2011/0225585 A1  Sep. 15, 2011

(51) Int. Cl.
  *G06F 9/46* (2006.01)
  *G06F 12/00* (2006.01)
  *G06F 9/52* (2006.01)

(52) U.S. Cl.
  CPC .......... *G06F 9/526* (2013.01); *G06F 2209/523* (2013.01)
  USPC ............................ 718/100; 711/147; 710/200

(58) Field of Classification Search
  None
  See application file for complete search history.

(56) References Cited

U.S. PATENT DOCUMENTS

| | | | |
|---|---|---|---|
| 6,546,443 B1 | 4/2003 | Kakivaya et al. | |
| 6,792,601 B1 | 9/2004 | Dimpsey et al. | |
| 6,823,511 B1 | 11/2004 | McKenney et al. | |
| 2002/0078284 A1 | 6/2002 | McKenney | |
| 2002/0083294 A1* | 6/2002 | Allison et al. | 711/207 |
| 2005/0149634 A1* | 7/2005 | McKenney | 709/248 |
| 2006/0168585 A1* | 7/2006 | Grcevski et al. | 718/104 |
| 2006/0230411 A1 | 10/2006 | Richter et al. | |
| 2007/0067774 A1* | 3/2007 | Kukanov et al. | 718/102 |
| 2007/0198792 A1* | 8/2007 | Dice et al. | 711/163 |
| 2007/0239915 A1* | 10/2007 | Saha et al. | 710/200 |
| 2009/0044194 A1* | 2/2009 | Rathi | 718/104 |
| 2010/0042997 A1* | 2/2010 | Lev et al. | 718/100 |
| 2010/0153953 A1* | 6/2010 | Adl-Tabatabai et al. | 718/101 |
| 2010/0241774 A1* | 9/2010 | Olszewski et al. | 710/200 |
| 2010/0275209 A1* | 10/2010 | Detlefs | 718/102 |
| 2010/0333096 A1* | 12/2010 | Dice et al. | 718/102 |
| 2011/0138135 A1* | 6/2011 | Dice et al. | 711/152 |
| 2012/0089760 A1* | 4/2012 | Saha et al. | 710/200 |

FOREIGN PATENT DOCUMENTS

WO  2007028807 A1  3/2007

OTHER PUBLICATIONS

Onodera et al; A Study of Locking Objects With Bimodal Fields, Oct. 1999, Sigplan notices ACM, USA, p. 223-237.
Lim, Reactive Synchronization Algorithms for Multiprocessors, 1-162, Massachusetts Institute of Technology, Feb. 1995, p. 1-162.
European Patent office, International Searching Authority, EP2011052189, Jun. 15, 2011.

(Continued)

*Primary Examiner* — Mengyao Zhe
*Assistant Examiner* — Tammy Lee
(74) *Attorney, Agent, or Firm* — Garg Law Firm, PLLC; Rakesh Garg; Damion Josephs (57) ABSTRACT

A method, system, and computer usable program product for retooling lock interfaces for using a dual mode reader writer lock. An invocation of a method is received using an interface. The method is configured to operate on a lock associated with a resource in a data processing system. A determination is made whether the lock is an upgraded lock. The upgraded lock is the DML operating in an upgraded mode. An operation corresponding to the method is executed on the DML, if the lock is the upgraded lock.

20 Claims, 5 Drawing Sheets

(56) References Cited

OTHER PUBLICATIONS

IBM-; Method for Automatically Switching Between Read and Write (Shared and Exclusive) Locks on a Resource While Guaranteeing Deadlock Avoidance; IP.com/IBM TDB, Oct. 8, 2008.

Holm-et al.; "Adaptive Lock Escalation/De-escalation"; IP.com/IBM TDB; Jan. 1, 1992.

Hossain-et al.; "Improving Support for Locality and Fine-Grain Sharing in Chip Multiprocessors": ACM Digital Library; pp. 155-165, Oct. 2008.

Baugh-et al.; "Using Hardware Memory Protection to Build a High-Performance, Strongly-Atomic Hybrid Transactional Memory"; ACM/IEEE, pp. 115-125, 2008.

\* cited by examiner

RETOOLING LOCK INTERFACES FOR USING A DUAL MODE READER WRITER LOCK

RELATED APPLICATIONS

The present invention is related to similar subject matter of co-pending and commonly assigned U.S. patent application Ser. No. 12/723,717 entitled "DUAL MODE READER WRITER LOCK," filed on Mar. 15, 2010, and U.S. patent application Ser. No. 12/723,714 entitled "USING A DUAL MODE READER WRITER LOCK," filed on Mar. 15, 2010, which are hereby incorporated by reference.

BACKGROUND OF THE INVENTION

1. Field of the Invention

The present invention relates generally to an improved data processing system, and in particular, to a computer implemented method for improving the reading and writing of data. Still more particularly, the present invention relates to a computer implemented method, system, and computer usable program code for using a dual mode reader writer lock (DML).

2. Description of the Related Art

Processes executing in a data processing system read and write data associated with a variety of resources. A data file, a memory location, and an address on a disk are some examples of such a resource.

When a process executing in a data processing system has to read or write data from or to a resource, the operating system has to sequence and control the read/write requests. This control is important in ensuring that read and write requests for the same resource by multiple processes do not compromise the integrity of the data of that resource. For example, a process should not be allowed to read data while another process is writing that data. Multiple processes may be allowed to read the same data simultaneously but not in conjunction with one or more processes attempting to write that data.

To implement these and other rules for reading and writing data, operating systems implement locks. A read write lock is a data structure whose data has to be set or reset, or incremented or decremented before a process can read or write the data of an associated resource. Such a lock is also known as a reader writer lock (RWL) or a complex lock.

Setting or incrementing a RWL is called acquiring or getting a lock. Resetting or decrementing a RWL is called releasing or freeing a lock. A reader lock or a read lock is a state of a RWL that permits a process or thread to read the resource associated with the RWL. Multiple processes or threads can concurrently acquire a read lock on a common resource. A writer lock or a write lock is a state of a RWL that permits a thread to write data to the resource associated with the RWL. Only a single thread can acquire a single write lock on the resource at any given time, and no thread can hold or acquire a read lock while another thread holds a write lock on the resource.

Typically, a RWL is implemented using a single data word. A data word is a specific number of bits that are handled together in the architecture of an operating system. In one case, the size of a data word may be the number of bits that can be held in a single register in a particular processor of the data processing system. In another case, the data word size may be the minimum number of bits can be transferred from a given memory to a given processor. Commonly available operating systems have implemented data word sizes of sixteen, thirty two, sixty four, and one hundred and twenty eight bits. A data word may be of any size suitable for a particular implementation.

When an operating system manipulates a RWL, that manipulation must not be interrupted for the integrity of the lock. In other words, all the instructions for setting or resetting, or incrementing or decrementing a RWL must be executed from start to finish without being interrupted or preempted by another process. An operation whose set of instructions must be executed in this manner is called an atomic operation. Manipulation of a RWL is an atomic operation. Acquiring a lock and releasing a lock are examples of lock manipulations performed as atomic operations.

At any given time during the operation of a data processing system, several processes or threads may wish to acquire a lock for a common resource in close temporal proximity of one another. Several other processes or threads that have already acquired the lock may wish to release the lock at or near the same time. Some processes or threads wishing to acquire or release the lock may deal with read locks on the resource, while others may deal with write locks.

SUMMARY OF THE INVENTION

The illustrative embodiments provide a method, system, and computer usable program product for retooling lock interfaces for using a dual mode reader writer lock (DML). An embodiment receives an invocation of a method using an interface. The method is configured to operate on a lock associated with a resource in a data processing system. The embodiment determines whether the lock is an upgraded lock. The upgraded lock is the DML operating in an upgraded mode. The embodiment executes an operation on the DML corresponding to the method, if the lock is the upgraded lock.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Under certain circumstances, several atomic operations for each request to acquire or release a lock from several processes or threads may be pending in a data processing system. The invention recognizes that inundating the data processing system with several atomic operations for a RWL can adversely affect the performance of the data processing system.

For the clarity of the description, "process" is used to mean a process or a thread of a process. An operation with respect to a process is similarly applicable to a thread, and an operation with respect to a thread is similarly applicable to a process within the scope of the invention.

The invention further recognizes that under certain other circumstances, the data structure of the lock may be saturated and may not be able to accommodate any more lock requests. For example, a data word of hypothetical size of two bits will be saturated if four threads are already holding read locks on the associated resource because two bits can be used to count only from 0 to 4. A fifth thread requesting a read lock cannot be accommodated until one of the other four processes holding a read lock releases its read lock. The invention recognizes that a backlog of atomic operations waiting to execute on a RWL in a data processing system can also adversely affect the performance of the data processing system.

These circumstances are example scenarios where contention for RWLs arises in a data processing system. The invention recognizes that a contention for RWL is likely in a data processing system when the number of processes or threads contending for a RWL increase beyond a threshold number. The invention further recognizes that as the number of processors in a data processing system increase, such as in a multiprocessor data processing system or logical partition, the number of processes and threads also rises leading to the RWL contentions.

The illustrative embodiments used to describe the invention generally address and solve the above-described problems and other problems related to RWLs. The illustrative embodiments provide a method, computer usable program product, and data processing system for retooling lock interfaces for using a dual mode reader writer lock.

An embodiment of the invention may enable the data processing system to process atomic operations for a RWL with a reduced affect on the system performance as compared to the presently configured data processing system when the number of atomic operations reaches a threshold number. For example, for the same number of atomic operations performed for a single RWL, a data processing system implementing an embodiment of the invention may demonstrate better system performance as compared to a data processing system without the embodiment.

An embodiment of the invention may also allow more processes and threads to acquire and release locks concurrently with a diminished adverse affect on the system performance as compared to a presently configured data processing system. For example, for the same system performance, a data processing system employing an embodiment of the invention may allow more processes to acquire read locks on a resource as compared to a data processing system without the embodiment.

The illustrative embodiments are described with respect to data, data structures, indicators, and identifiers only as examples. Such descriptions are not intended to be limiting on the invention. For example, an illustrative embodiment described with respect to 64 bit data word may be implemented using a 128 bit data word in a similar manner within the scope of the invention.

Furthermore, the illustrative embodiments may be implemented with respect to any type of data processing system. For example, an illustrative embodiment described with respect to a multiprocessor standalone data processing system may be implemented in a multiprocessor logical partition system within the scope of the invention.

The illustrative embodiments are further described with respect to certain parameters, attributes, and configurations only as examples. Such descriptions are not intended to be limiting on the invention. An embodiment of the invention may be implemented with respect to any type of data processing system, such as, for example, any type of client system, server system, platform, or a combination thereof.

An application implementing an embodiment may take the form of data objects, code objects, encapsulated instructions, application fragments, services, and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
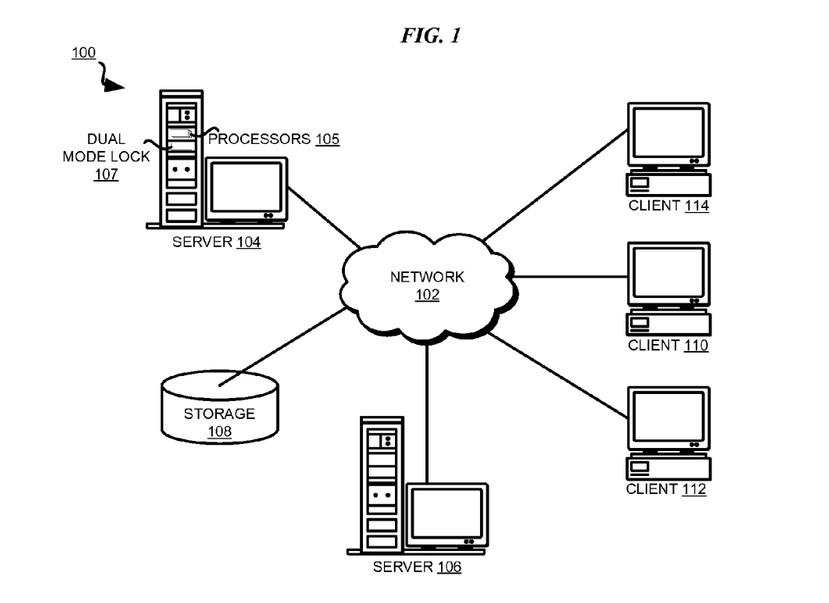
FIG. 1 depicts a pictorial representation of a network of data processing systems in which illustrative embodiments may be implemented.
Figure 2:
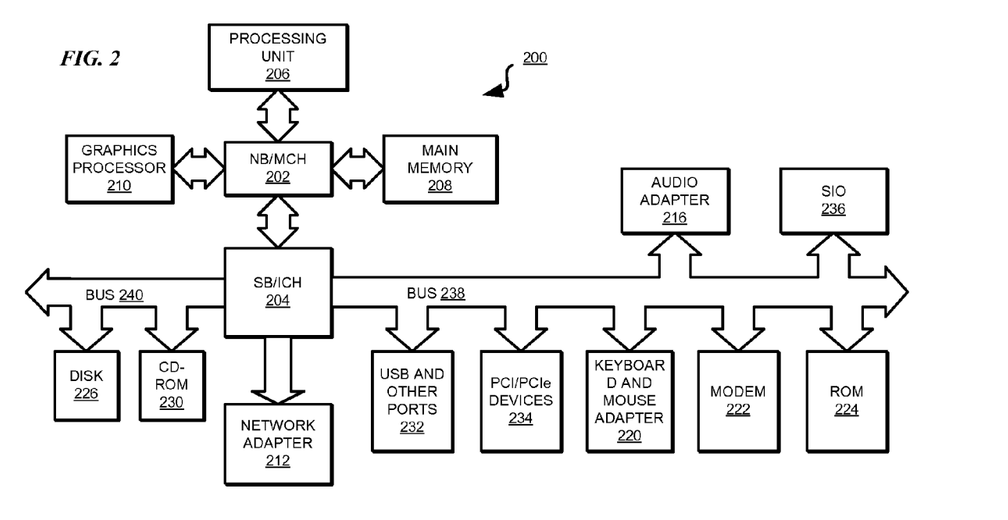
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include multiple processors 105. Other depicted data processing systems may also include more than one processor in a similar manner (not shown). Server 104 may further include DML 107. DML 107 may be a DML according to an embodiment of the invention. DML 107 may be implemented in server 104 in conjunction with other RWLs without limitation. Furthermore, DML 107 may be configured in a data processing system other than server 104, such as in server 106, and may be accessible to server 104 over network 102.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Presently, software code exists that can be utilized for manipulating a RWL. Such software code is exposed to applications that wish to use the RWL via well defined application programming interface (API). The software code behind each API performs a manipulation function with respect to the presently used RWL. Applications that wish to use a RWL call one or more of these API to perform one or more of the associated functions on a RWL.

In accordance with an illustrative embodiment, a DML may take the place of a RWL in a given data processing system configuration. Accordingly, applications utilizing the RWL have to perform similar functions using the DML upon substitution.

In order to avoid having to modify the code of hundreds or thousands of applications that use locks, DML APIs should be similar to the APIs that are used for manipulating RWLs. The DML APIs should, however, implement the functions and operations behind those APIs with respect to a DML.

Configured in this manner, DML interfaces appear no different from the existing RWL interfaces to an application but the application can transparently use a DML where the application was previously using a RWL. From an operating system's point of view, the operating system can continue to expose familiar APIs to existing and new applications without having to address issues such as backward compatibility, support for multiple sets of lock types, or support for multiple sets of APIs.

Figure 3:
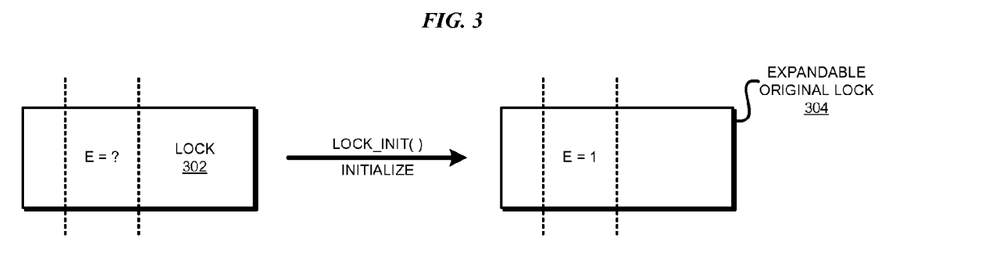
FIG. 3 depicts a block diagram of an example operation of an initializing API in accordance with an illustrative embodiment.

With reference to FIG. 3, this figure depicts a block diagram of an example operation of an initializing API in accordance with an illustrative embodiment. Lock 302 may be a RWL or an original lock element of a DML as described elsewhere in this disclosure.

To expand a DML or an original lock element thereof, the DML has to be expandable. The initialization of the expandable indicator in the lock word occurs by default for all locks initialized via the API lock_init( ) or another similar API. Upon initialization in this manner, the expandable indicator of lock 302 is set, for example as shown in lock 304. Lock 304 is an example expandable original lock element showing the expandable indicator as having been set to a value 1.

The particular API depicted in this figure is only an example and is not intended to be limiting on the invention. Any existing API for initializing a RWL can be modified in a similar manner to set the expandable indicator in a corresponding DML structure within the scope of the invention.

Figure 4:
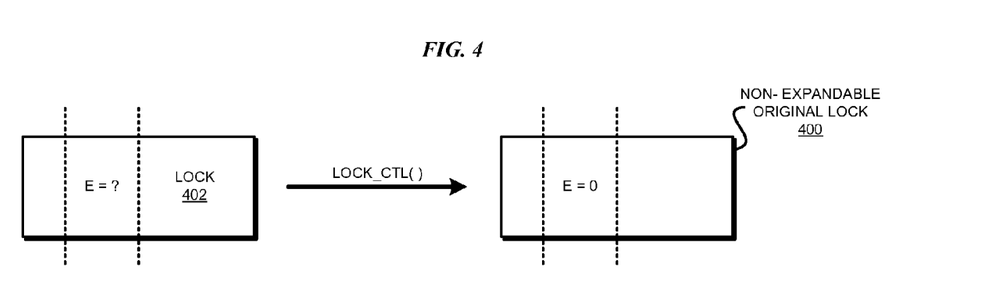
FIG. 4 depicts a block diagram of an example operation of another retooled API in accordance with an illustrative embodiment.

With reference to FIG. 4, this figure depicts a block diagram of an example operation of another retooled API in accordance with an illustrative embodiment. Lock 402 may be similar to lock 302 in FIG. 3.

In some cases, it may be desirable to not use an expanded lock structure, such as a DML with the expanded elements. In one embodiment, if the expandable indicator is reset, or set to a particular value, such as 0, the lock structure cannot be expanded, as shown in lock 404. API lock_ctl( ) or another similar API can be used to turn off or reset the expandable indicator so that a lock cannot be expanded. Lock 404 is an example of a non-expandable original lock element showing the expandable indicator as having been reset to a value 0.

Figure 5:
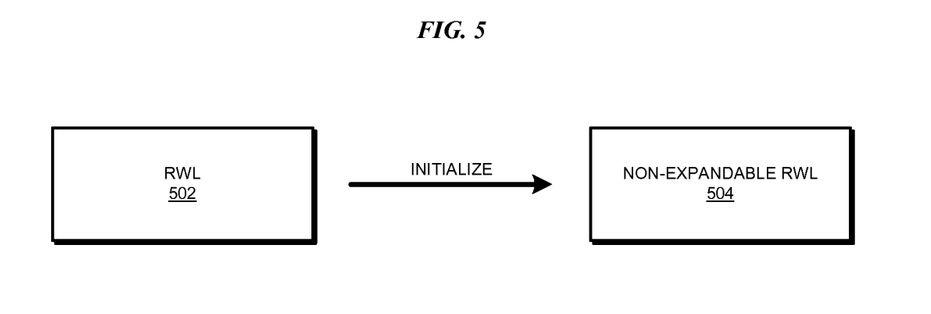
FIG. 5 depicts a block diagram of an example operation of another API in accordance with an illustrative embodiment.

With reference to FIG. 5, this figure depicts a block diagram of an example operation of another API in accordance with an illustrative embodiment. Lock 502 may be a presently used RWL.

In an embodiment, locks may be initialized differently for being an expandable lock or a non-expandable lock. For example, locks that are not initialized via lock_init( ) as shown in FIG. 3, may not be expandable. As shown in this figure, RWL 502 may be initialized using an API different from lock_init( ) to form non-expandable RWL 504. Thus, if desired, RWLs, non-expandable DMLs, and expandable DMLs can coexist in a data processing system and may be initialized differently from one another.

Figure 6:
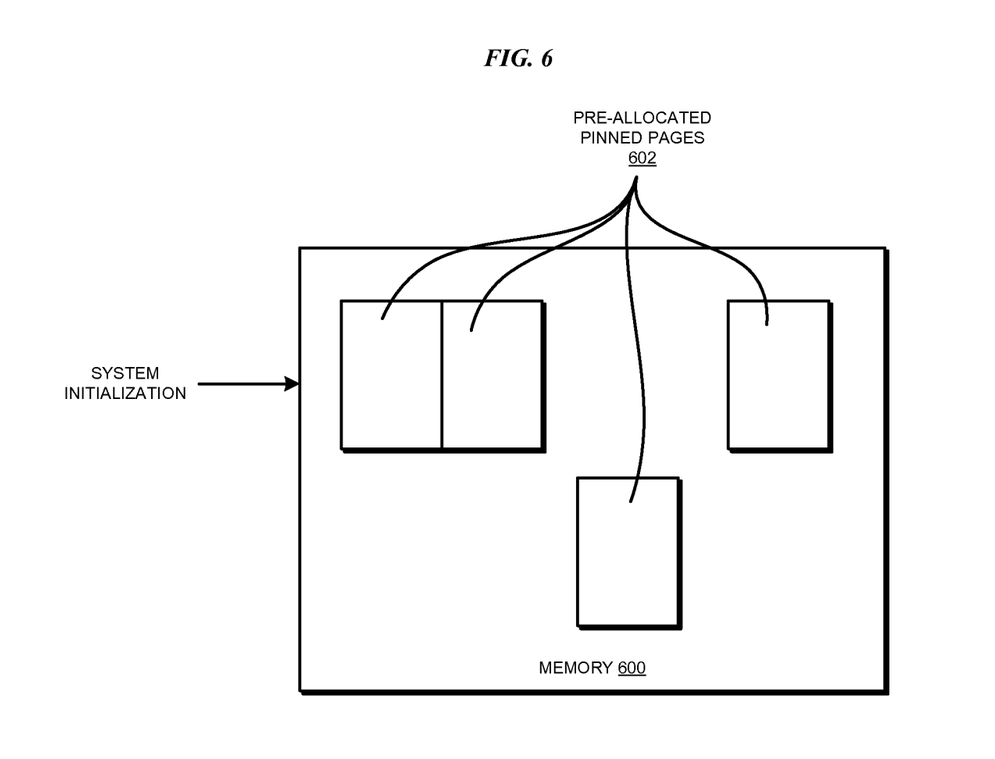
FIG. 6 depicts a block diagram of a lock cache in accordance with an illustrative embodiment.

With reference to FIG. 6, this figure depicts a block diagram of a lock cache in accordance with an illustrative embodiment. Memory 600 may be a lock cache, and may be implemented using main memory 208 in FIG. 2, or any other suitable data storage device or location in a data processing system without limitation.

A number of lock structures, such as storage for DML elements, may be pre-allocated at system initialization time so that those structures are available for lock transition. In one embodiment, a memory segment, such as memory 600, may be allocated for the DML elements to be used later as needed during transitions. The initial address of the segment may be kept in a global pointer.

In one embodiment, space 602 for lock structures may include several pages of one or more desirable page sizes. Space 602 may be pre-allocated and pinned in memory 600 at system initialization.

A number of pages in space 602 may depend on the volume of lock contentions encountered during the operation of a data processing system. In a system where lock contention is below a threshold volume, the number of pages in space 602 may be small, such as below a specified number of pages. In a system where lock contention is between two threshold volumes, the number of pages in space 602 may be a number in a specified range.

Memory 600 may be re-populated or space may be added to memory 600 if the pre-allocated cache is drained during the data processing system operation. For example, in one data processing environment, suitable code may be added to the xmgc kproc APIs to re-populate or extend the cache.

Figure 7:
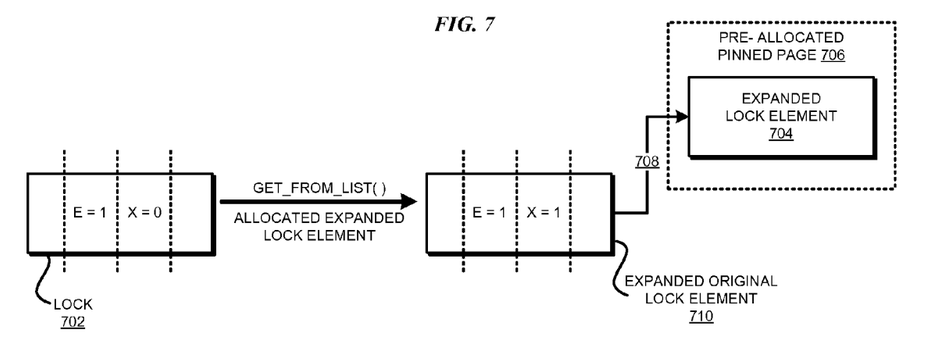
FIG. 7 depicts a block diagram of the operation of another retooled interface in accordance with an illustrative embodiment.

With reference to FIG. 7, this figure depicts a block diagram of the operation of another retooled interface in accordance with an illustrative embodiment. Lock 702 may be similar to expandable original lock 304 in FIG. 3.

Lock 702 may be configured as expandable but may not yet be expanded. For example, lock 702 may have the expandable indicator set and the expanded indicator reset in such a configuration.

In one example embodiment, during the transition of lock 702 from expandable mode to expanded mode, the interlock indicator is set and an expanded lock element is allocated. For example, a get_from_list( ) API may be modified to allocate expanded lock element 704 from pre-allocated pinned page 706. Pre-allocated pinned page 706 may be a page in space 602 in FIG. 6. Index 708 of the expanded lock element 704 is maintained in expanded original lock element 710. Expanded original lock element 710 is the expanded configuration of lock 702 and has both the expandable indicator and the expanded indicator set.

Figure 8:
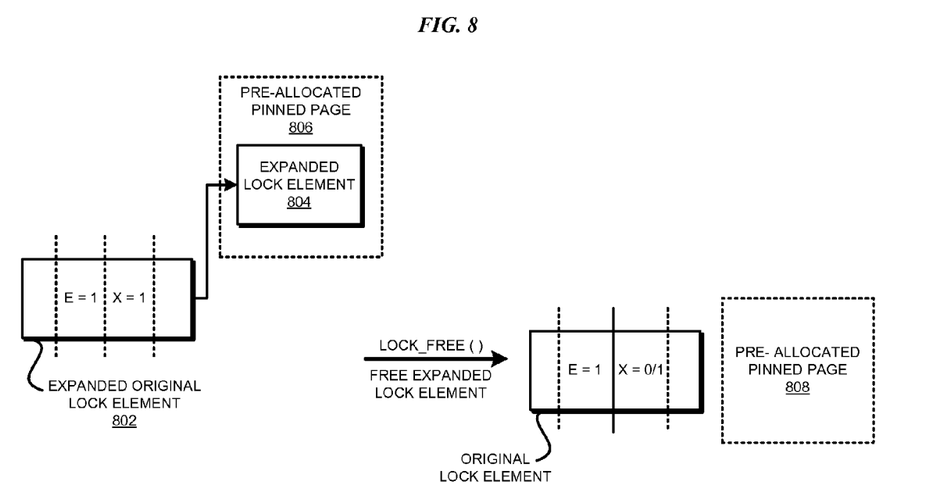
FIG. 8 depicts a block diagram of the operation of another retooled interface in accordance with an illustrative embodiment.

With reference to FIG. 8, this figure depicts a block diagram of the operation of another retooled interface in accordance with an illustrative embodiment. Expanded original lock element 802 may be similar to expanded original lock element 710 in FIG. 7. Expanded lock element 804 in pre-allocated pinned page 806 may be similar to expanded lock element 704 in pre-allocated pinned page 706 in FIG. 7. Expanded original lock element 802 may have the expandable indicator and the expanded indicator set to specific values to indicate the expanded configuration of the DML.

API lock_free( ) can be modified to free expanded lock element 804. Freeing expanded lock element 804 in pre-allocated pinned page 806 causes pre-allocated pinned page 806 to transform to pre-allocated pinned page 808.

Once expanded lock element 804 is freed, expanded original lock element 802 transforms to original lock element 810, which may or may not be expanded depending on whether additional expanded lock elements remain indexed within original lock element 810. If no more expanded lock elements are indexed within original lock element 810, the expandable indicator may remain set for allowing future expansion and the expanded indicator may be reset. If one or more expanded lock elements are still indexed within original lock element 810, the expandable indicator and the expanded indicator may each remain set to indicate the expanded configuration.

API lock_free( ) may be modified such that the space freed in pre-allocated pinned page 808 by freeing expanded lock element 804 can be used again by same or different expanding DML in the future. In one embodiment, expanded lock element structures may preferably be allocated within the context of a modified lock_read( ) operation for maintaining the integrity of the lock.

Figure 9:
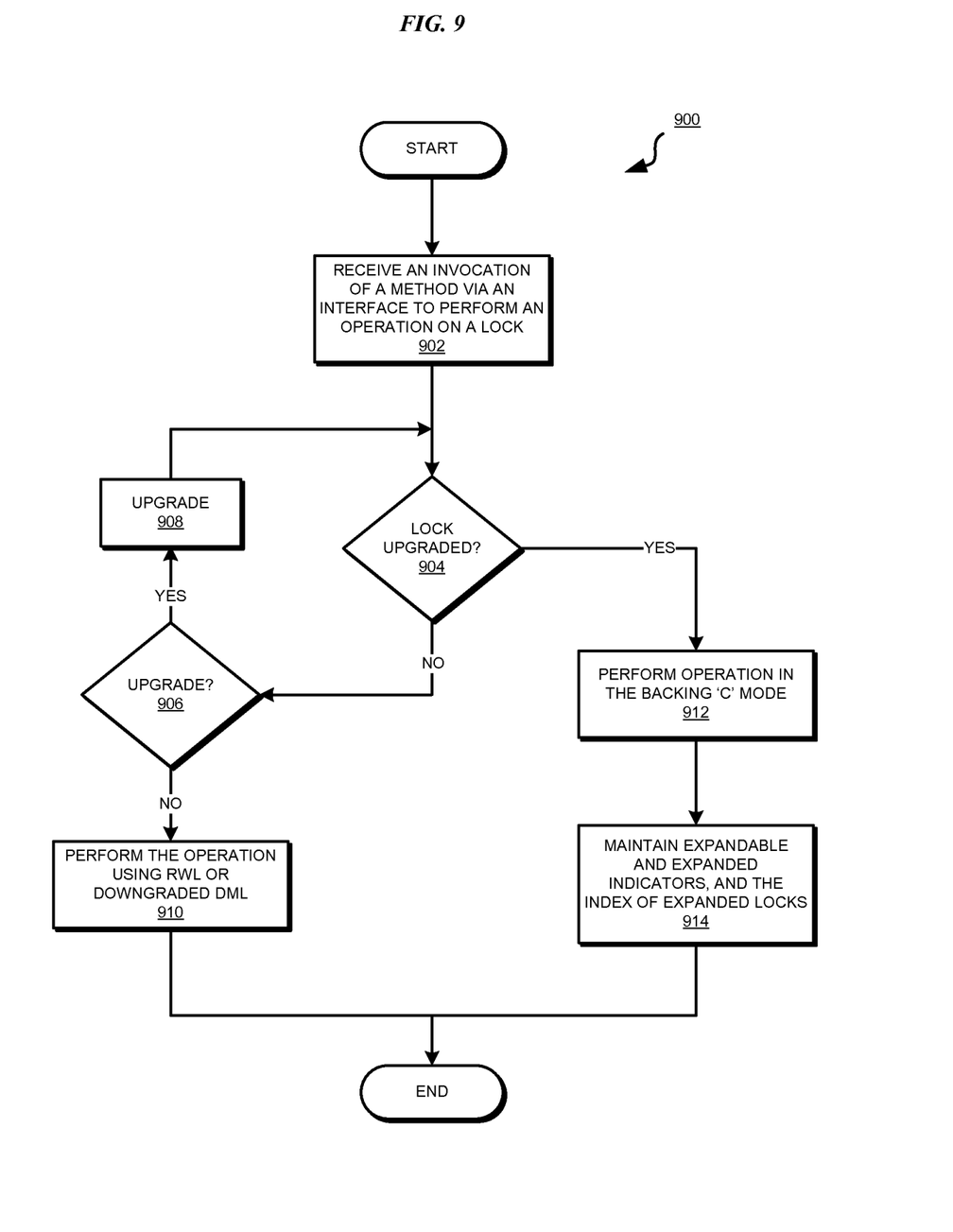
FIG. 9 depicts a flowchart of an example process of using a retooled interface with a DML in accordance with an illustrative embodiment.

With reference to FIG. 9, this figure depicts a flowchart of an example process of using a retooled interface with a DML in accordance with an illustrative embodiment. Process 900 may be implemented in an application for administrating locks in a data processing system, such as in an operating system or a component thereof of server 104 in FIG. 1.

Process 900 begins by receiving an invocation of an interface to perform an operation on a lock (step 902). The interface invoked may be the interface of a retooled existing method designed to work with a RWL or of a new method designed to work with a DML. Process 900 determines whether the lock that is the subject of the operation is an upgraded lock (step 904).

If the lock is not an upgraded lock ("No" path of step 904) the lock may be a RWL or a downgraded DML as described elsewhere in this disclosure. Accordingly, process 900 determines whether to upgrade the lock (step 906). If process 900 upgrades the lock ("Yes" path of step 906), process 900 may perform the upgrade of the lock (step 908). For performing step 908, process 900 may invoke an upgrading process (not shown) as described elsewhere in this disclosure. Following an upgrade of the lock in step 908, process 900 returns to step 904.

If process 900 decides not to upgrade the lock ("No" path of step 906), process 900 performs the operation of the invocation using a RWL or a downgraded DML (step 910).

If the lock is an upgraded lock ("Yes" path of step 904), process 900 performs the desired operation of the invocation in the backing high level language mode (step 912). Backing high level language mode is simply the execution of a part of the logic of process 900 that is coded in a high level language, assuming that another part of process 900 is coded in assembler or another low level language.

Process 900 maintains the expandable and expanded indicators, and the index of expanded lock elements as needed for the upgraded lock (step 914). Process 900 ends thereafter.

A high level programming language is a programming language that uses abstracted concepts of data processing system and provides a user a user-friendly, human understandable programming lexicon. C, C++, and Java are some examples of high level programming languages.

A low level programming language is a programming language that employs a lower level of abstraction or no abstraction of the concepts of a data processing system. Machine language or binary code is regarded as the lowest level language. Assembly language, or assembler code, is regarded as another low level programming language.

Process 900 may be particularly useful for modifying the low level programming language code, generally assembler code, that implement lock_read( ) lock_write( ) lock_done( ) and any other APIs or routines that include any low level language 'front end'. The assembler routines are generally very short and highly optimized paths to handle the most frequent cases, which do not involve upgrade or contention. These routines are generally the logical 'front end' to a high level programming language code that each of these short routines calls to compute the more complicated paths.

In one embodiment, the logic to handle upgraded DMLs may be implemented in a high level language, such as in 'c' language. An implementation of process 900 may include a check in a low level programming language, such as in assembler code, to determine if the lock is upgraded as in step 904. If the lock is upgraded, the implementation may branch to the 'c' code or another high level language code, which is more convenient for programming the logic code than the assembler language. Such a switch is a part of the backing higher level language mode operation of process 900. The assembler code and the higher level language code may together implement portions of process 900 in some combination.

Many commonly implemented interfaces for using locks can be modified or retooled to operate using DML of an embodiment. Pseudo code for implementing some example retooled interfaces is provided here to illustrate the mechanism of using these APIs, routines, functions, methods, or services with a DML. The pseudo code described here can be easily converted into functioning code in any higher or lower level programming language of choice or a combination thereof without limitation. Furthermore, the pseudo code is not intended to be comprehensive but only intended to illustrate certain considerations in implementing these interfaces for operations with a DML. Additional or different features or modifications can be integrated into existing interfaces for accomplishing similar purpose and the same are contemplated within the scope of the invention.

In the example pseudo code described herein, when an operation is set to execute 'atomically', a possibility exists that the atomic operation will fail. For the purposes of these examples, a failed atomic operation simply means that when the attempt is made, the data at the location does not contain the value that is expected or a race condition exists. 'Failure' may mean that there is a race and the logic might need to retry or re-read. In some cases the atomic operation can be performed again without retrying all the surrounding logic, depending on the circumstances. Some sections of the example pseudo code briefly describe example consequences of failure.

References to complex lock in the pseudo code refer to a DML according to an embodiment. An interface with the words "complex_lock" or other similar phrase may be an implementation with respect to an existing RWL that may continue to exist in that form of the API but operate with respect to a DML.

Other nomenclature, abbreviations, and shortened words, for example, reader, writer, waiter, tid, id, sleep, wakeup, and many others, as used in the pseudo code refer to their logically corresponding names and nomenclatures in this disclosure or as commonly used in software programming for lock manipulation. One of ordinary skill in the art will be able to identify the correspondence using this disclosure.

As one example, wakeup_c_lock interface can be retooled to operate in conjunction with a DML in the following example way:

```
/* wakeup_readers_or_id_writers option:
 * wakes up all waiting readers down to
 * a waiting writer or reports the tid of the
 * writer at the top of the list. Waiters are
 * on the list in the order they arrived to wait.
 * returns False (0) if no waiters
 * returns True (1) if readers waiting
 * returns tid (greater than 1) if writer waiting
 * wakeup_writer option completes the wakeup of
 * a previously identified writer
 * unlock option unlocks the wait list that was
 * left locked for lock_write_to_read since it
 * might not be able to complete wakeup)
 */
wakeup_c_lock( lockaddr, option )
{
    found readers = FALSE;
    if unlock option
        unlock wait list
        return
    lock wait list
    retrieve list anchor
    if wakeup_reader_or_id_writer
    {
again:
        if there is a next waiter on list
            if next on list is writer
            {
                if found_readers == FALSE
                {
                    return tid, leave wait list locked
                }
                return found_readers
            }
            else
            {
                found readers = TRUE since we will awaken at least one
                remove from list and wakeup this thread (make runnable)
                goto again
            }
            /* no more waiters */
            return found_readers
    }
    if wakeup_writer option
    {
        remove and wakeup writer
        return
    }
}
```

As another example, complex_lock_sleep interface can be retooled to operate in conjunction with a DML in the following example way:

```
/* This service may support being called
 * with INTERLOCK already set or possibly not
 * set. This function inserts the calling thread
 *on the lock's wait list.
 */
int
complex_lock_sleep ( lock address , type of wait,
pointer to return value didsleep indicator, flag for
whether interlock is already held)
{
retry:
        (re) read the lock word
        if the lock is owned by a reader or writer
        {
            atomically set INTERLOCK and WAITING
            goto retry if failure to set
            boost the priority of the lock owner if necessary
            release interlock
            wait on owner to wakeup at lock release
        }
}
```

As another example, lock_write interface can be retooled to operate in conjunction with a DML in the following example way:

```
void
lock_write (lockaddr 1)
{
        compute new owner (us)
        if we already hold the lock (recursion),
handle and return
retry:
        (re) read lock word
        if the lock is busy (READ_MODE set OR bits on in OWNER field),
        {
            atomically set WANT_WRITE if not already on
            goto retry on failure
            wait on lock wakeup
(complex_lock_sleep)
            when we awaken, we own the lock and return
        }
        not busy, so atomically set the owner
        goto retry on failure
}
```

As another example, lock_read interface can be retooled to operate in conjunction with a DML in the following example way:

```
/*
 * NAME: lock_read
 * FUNCTION: lock a complex lock for read access
 * RETURNS: no return
 */
lock_read( lock address )
{
        if thread owns in write mode, handle recursion and return
        compute hash of this thread
retry:
        (re) read the lock status
        if UPGRADED bit is set /*lock already upgraded*/
        {
            if lock in read mode and (there is no writer
                wanting the lock OR we slept once already)
            {
                compute rle address
```

-continued

```
                read rle value
                If reader lock is downgraded, this
means a race condition so goto retry
                if READ_MODE set in the reader lock
element
                {
                        atomically increment the reader
lock element
                        goto retry on failure
                        /* this is the optimized path */
                        return;
                }
                /* not set. this sequence required to
set it */
                disable interrupts
                atomically set INTERLOCK in outer lock
                enable and goto retry on failure
                atomically set READ_MODE and count to
one in reader lock element
                if atomic update fails, it implies a
race condition
                        where another thread has set
READ_MODE
                {
                        atomically increment count (always
works)
                        return
                }
                atomically turn off interlock in outer
lock (until success)
                return
                }
                else
                if the lock is completely free, take it
                {
                        disable
                        atomically set INTERLOCK in outer lock
                        goto retry on failure
                        compute reader lock element
                        atomically set rle to READ_MODE with
count 1.
                        assert this works
                        atomically clear INTERLOCK and set
READ_MODE
                                in outer lock
                        also must succeed
                        return
                }
                else
                {
                        wait on wakeup lock
(complex_lock_sleep)
                        goto retry
                }
                }
                /* Not an upgraded lock but could be
expandable */
                if WANT_WRITE is set or writer owns, wait
for wakeup lock
                if the lock is held in read mode and we've
already waited
                {
                        if EXPANDABLE lock
                        {
                         if EXPANDED /* previously */
                         {
                                if current count > transition value
                                {
                                upgrade lock
                                goto retry
                                }
                        }
                        else /* never expanded before */
                        {
                                if current count > different
transition value
                                {
                                if expand and upgrade lock success
                                        return /* lock held */
```

-continued

```
                                else fall through
                                }
                        }
                        }
                        atomically increment the count
                        goto retry on failure
                        return
                }
                if lock completely free take it
                {
                        atomically set lock state to READ_MODE
and count1
                        goto retry on fail
                        return
                }
                goto retry
        }
```

As another example, expand_and_upgrade_lock interface can be implemented to operate in conjunction with a DML in the following example way:

```
                /* expand and upgrade is different than just
upgrade */
                Expand and Upgrade lock (returns success/fail)
                {
                        disable interrupts
                        atomically set INTERLOCK and increment count
                        return fail on failure
                        allocate/init a set of reader locks
                        atomically store READ_MODE and count to
RLE(0)
                        assert must succeed
                        atomically store the lock index, clear
INTERLOCK, clear OWNER
                                of outer lock until success
                        return success
                }
```

As another example, lock_done interface can be retooled to operate in conjunction with a DML in the following example way:

```
                /* unlock a DML in read or write mode */
                lock_done( lock address )
                {
                        compute hash of rle for this thread
retry_enabled:
                        (re) read lock status
                        if UPGRADED)
                        {
                                if READ_MODE
                                {
                                compute rle address
retry_decrement_read:
                                read rle status
                                /*
                                * if the reader lock element has been
                                * downgraded, we hit a race condition.
                                * Re-read the lock word because it
                                * isn't upgraded any more.
                                */
                                if RLE_DOWNGRADED
                                {
                                        goto retry_enabled;
                                }
                                /* if READ_MODE not set, must set it */
                                if rl_status == 0 goto need_interlock;
                                if not the last unlocker (at least one
other read lock holder)
                                {
                                        atomically decrement count
                                        goto retry_decrement_read on fail
```

```
                    return
                }
            }
            goto need_interlock;
        }
        if INTERLOCK goto retry_enabled
        /* not an upgraded lock */
        if READ_MODE
        {
            if at least one other lock owner OR
                last but WAITING not set (no waiters)
            {
                atomically decrement count
                goto retry_enabled if fail
                return
            }
        }
need_interlock:
        disable
        atomically set interlock
        enable and goto retry_enabled if failure
retry:
        (re) read lock status
        /* if this is currently an upgraded lock */
        if UPGRADED
        {
            if READ_MODE
            {
                compute rle address
retry_clear_read:
                read rle status
                rl_value = orig_rl_value =
RL_VALUE(rl,hash);
                check rle downgraded (atomically read
if clearly stale)
                if rle is already zero
                {
                    hash = index of 1st non zero rle
                }
                /* note we haven't decremented anything
                 * yet . . . we've just looked to
                 * see what would happen if we did
                 */
                if we will be last to decrement
rle[hash]
                {
                    atomically set rle to zero
                    goto retry_clear_read on failure
                    atomically read other rle until
non-zero entry found
                    /* atomic read is a load and store
back the same value atomically */
                    if still some other non-zero rle
                    {
                        /* others remain, so */
                        atomically clear INTERLOCK
                        return
                    }
                    /* note all rle are zero -- we're
last owner */
                    if WAITING /* there are waiters
for the lock */
                    {
                        /* all readers down to next
writer . . . note waiters queued in order..OR if a writer is
next, let us know who it is w/o actually waking up
                         */
                        writer waiting=wakeup_c_lock
                    }
                    else
                    {
                        /* downgrade when last reader
unlocks with no waiters */
                        downgrade the lock
                    }
                    /* If we're waking up a writer */
                    if(writer waiting)
                    {
                        store tid returned from
wakeup_c_lock
                                atomically clear owner,
READ_MODE and WANT_WRITE while
                                    setting WAITING if there are
more waiters (returned from wakeup_c_lock)
                                make_writer_runnable /* finish
wake up */
                                atomically clear INTERLOCK
                    }
                    else /* possibly woke up a reader
or readers */
                    {
                        atomically clear INTERLOCK
while conditionally
                            setting WAITING or clearing
WAITING, depending
                            on whether there are more
waiters besides the ones
                            we just woke up
                    }
                }
                else /* still other readers left,
so we're done */
                {
                    atomically clear INTERLOCK
                }
                enable
                return
            }
        }
        /* not an upgraded lock or lock held in
write mode */
        if READ_MODE
        {
            if we will be last to unlock
            {
                /* wake up readers or report writer to
awaken */
                waiting=wakeup_c_lock( )
            }
            else
            {
                atomically decrement lock and clear
INTERLOCK
                enable
                return;
            }
        }
        else /* unlock writer */
        {
            possibly handle recursive lock and
return.. otherwise..
            if there are waiters
            lockword &= ~OWNER_MASK;
            if ((lockword & WAITING))
            {
                /* wake up readers or report writer to
awaken */
                waiting=wakeup_c_lock( )
            }
            else /* writer unlocking with no waiters
*/
            {
                /* so downgrade the lock */
                if UPGRADED lock
                {
                    downgrade the lock;
                    clk_downgrade((complex_lock_t)l);
                    return;
                }
            }
        }
        /* If we're waking up a writer */
        if(writer waiting)
        {
            store tid returned from wakeup_c_lock
                atomically clear owner, READ_MODE
and WANT_WRITE while
                    setting WAITING
```

```
    if there are more waiters (returned
                                from
wakeup_c_lock)
                    make_writer_runnable /* finish
wake up */
                    atomically clear INTERLOCK
        }
                else /* possibly woke up a reader or
readers */
                {
                    atomically clear INTERLOCK while
conditionally
                                setting WAITING
or clearing WAITING, depending
                                on whether there
are more waiters besides the ones
                                we just woke up
                    Note this frees the lock also
                }
            return
        }
```

As another example, lock_read_to_write interface can be retooled to operate in conjunction with a DML in the following example way:

```
    /*
     * NOTE: if another reader has already requested
     * a write-upgrade to a read lock, no lock is
     * held upon return. That is, this routine
     * always releases the read lock, whereas
     * lock_try_read_to_write does not
     * give up the read lock if the lock cannot be
     * write-upgraded.
     * RETURNS: FALSE if lock held in WRITE MODE on
return
     *          TRUE if lock not held at all
     */
    boolean
    lock_read_to_write( lock address )
    {
    retry:
            read lock status
            /* This service always fails for upgraded
locks. This service is best
             * suited for lightly contended locks.
             */
            if UPGRADED
            {
                lock_done(lockaddr);
                return(TRUE);
            }
            if INTERLOCK goto retry;
            if there are waiters
            {
                    disable
                    atomically set interlock
                    enable and goto retry on failure
retry_with_interlock:
                    if we will be last to unlock
                    {
                        /* wakeup readers or
report writer tid */
                            waiting = wakeup_c_lock;
                    }
                    else
                    {
                            atomically clear interlock
and decrement count
                            return TRUE
                    }
            retry_waiting:
                    if writer was reported
                    {
                            atomically clear owner,
read_mode and store TID
```

```
                            to hand off lock
                            /* finish wake up */
                            wakeup_c_lock(lockaddr,
WAKEUP_LOCK_WRITER_OR_UPGRADER,
                                &waiting);
                            atomically clear INTERLOCK
                    }
                    else {
                            atomically clear owner either
set or clear
                                    WAITING depending on
whether waiters remain
                    }
                    return TRUE /* lock not held */
            }
        f READ_MODE
            {
                    disable
                    set WANT_WRITE and INTERLOCK
atomically
                    complex_lock_sleep ( );
                    awaken holding the lock
                    return FALSE
            }
            else /* completely free */
            {
                    atomically store our thread id to
claim the lock
                    return FALSE
            }
    }
```

As another example, lock_write_to_read interface can be retooled to operate in conjunction with a DML in the following example way:

```
            lock_write_to_read( lock address )
                sync
                disable
                atomically set interlock
                if UPGRADED
                {
                    compute rle address
                    read rle value
                    atomically set rle to READ_MODE
and count 1
                }
                SYNC( ); /* lock done */
                disable
                atomically set INTERLOCK
                if there are waiters for the lock
                {
                        /* wakeup the readers or report
if we have a writer
                         * without actually waking it
                         */
                        waiting = wakeup_c_lock( )
                }
                atomically clear owner and set READ_MODE
                    note if not UPGRADED also set
count to one
                    if a writer was first on list, unlock
wait list without awakening
                    else if we woke up readers
                    {
                        if waiters remain
                                atomically set WANT_WRITE
and WAITING and
                                    clear INTERLOCK
since writers await
                        else
                                atomically clear
```

```
        INTERLOCK and WAITING
                }
                        else atomically clear INTERLOCK and
WAITING
        }
```

As another example, lock_try_write interface can be retooled to operate in conjunction with a DML in the following example way:

```
                boolean_t
                lock_try_write( lockaddr)
                {
                retry:
                        read lock word
                        if INTERLOCK return FALSE
                        if recursive, handle and return
                        if held in read or write mode return
FALSE
                        atomically store our tid in lock
                        goto retry if fail
                        return TRUE
                }
```

As another example, lock_try_read interface can be retooled to operate in conjunction with a DML in the following example way:

```
        /*
        returns TRUE if lock acquired
                FALSE if not acquired
        */
        boolean
        lock_try_read(lockaddr)
        {
                compute hash
        retry:
                read lock status
                if UPGRADED
                {
                        if held in read mode and no writer
waiting
                        {
                                compute rle addr
                                read rle value
                                if RLE_DOWNGRADED goto retry /*
stale */
                                if READ_MODE on in RLE
                                {
                                        atomically increment
count
                                        return TRUE
                                }
                                /* not set, need interlock to set
*/
                                disable
                                atomically set INTERLOCK
                                goto retry if fail
                retry_set_reader:
                                /* could see race condition where
other cpu set READ_MODE */
                                /* The reader lock will be zero
unless we were beat */
                                atomically set READ_MODE in rle
and count to one
                                enable and goto retry if fail
                                clear INTERLOCK
                                enable
                                return TRUE
                        }
                }
                /* not upgraded
                if writer wants or holds the lock
```

```
                        return FALSE
                atomically set READ_MODE and incement count
                goto retry if fail
                return
        }
```

As another example, lock_try_read_to_write interface can be retooled to operate in conjunction with a DML in the following example way:

```
        boolean_t
        lock_try_read_to_write(lockaddr)
                disable
        retry:
                (re) read lock status
                if UPGRADED
                {
                        enable
                        return FALSE /* lock still held */
                }
                if we will not be last to unlock
                {
                        atomically set INTERLOCK and WANT_WRITE
                        complex_lock_sleep
                        awaken holding the lock
                        return
                }
                        else /* we are last, so lock is available
for write mode now */
                {
                        atomically store our ID into OWNER
field
                        goto retry if fail
                        enable
                        return TRUE;
                }
        }
```

As another example, upgrade_complex_lock or clk_upgrade interface can be implemented to operate in conjunction with a DML in the following example way:

```
        clk_upgrade(lock addr)
        {
                disable
                atomically set interlock
                if lock state has changes such that
INTERLOCK was
                        already on or READ_MODE is off or
UPGRADED is off
                        return without upgrading
                compute rle addr
                atomically store count (from lock) to rle
                        until success
                set other rles to zero (turn off
RLE_DOWNGRADED)
                        atomically turn clear INTERLOCK, set
UPGRADED, clear OWNER
                enable
                return;
        }
        As another example, downgrade_complex_lock or
        clk_downgrade interface can be implemented to operate in
        conjunction with a DML in the following example way:
        /*
        * This routine is called disabled
        * holding the interlock bit.
        */
        void
        clk_downgrade(complex_lock_t l)
        {
                read lock status
                compute rle addr
```

```
    atomically set RLEs to RLE_DOWNGRADED
    atomically clear UPGRADED in lock word
}
```

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Any code or pseudo code described above is described only as an example. The nomenclature, identifiers, references, functions, operations, and data structures have been selected for the clarity of the description and are not limiting on the illustrative embodiments of the invention. Furthermore any logic, conditions, or processing have also been selected for the clarity of the description and are not limiting on the illustrative embodiments of the invention. Any notes or comments embedded in the code or pseudo code are not intended to be limiting on the invention and are included merely as additional clarifying information. The nomenclature, identifiers, references, functions, operations, data structures, logic, conditions, or processing can be combined, modified, or replaced, or alternatively implemented for similar purpose within the scope of the invention.

Thus, a computer implemented method, apparatus, and computer program product are provided in the illustrative embodiments for retooling lock interfaces for using a dual mode reader writer lock. Using the embodiments of the invention, a data processing system can operate with improved efficiency under lock contention conditions. Using the embodiment, a data processing system can operate with improved efficiency also when a RWL is saturated and can hold no more locks.

A DML according to an embodiment can operate as a presently used RWL, using only the original lock element of the expanded or unexpanded DML, when demand for the lock is below a threshold. When the demand for the lock reaches or exceeds the threshold, to wit, when a contention condition exists for the lock, the DML can transform to operate using expanded locks. In other words, a DML according to an embodiment can be upgraded to operate in the expanded mode or downgraded to operate in the original mode depending on the demand for the lock.

The structure of a lock, whether a RWL or a DML is a data structure in any suitable data storage location. In one embodiment, an existing RWL may occupy less than 1 data word of space. In such an embodiment, the original lock and one or more expanded locks can be accommodated within 1 data word within the scope of the illustrative embodiments. Expanded locks have been described as holding reader locks only as some example embodiments of the invention. Upon suitable modifications, expanded locks can be used for holding a combination of types of locks, including write locks.

An embodiment of the invention may facilitate maintaining the integrity of the DML while operating the DML. As one example method for maintaining the integrity of the DML, the interlock indicator may be set to cause one operation to wait while another completes with respect to one or more elements of the DML. Other indicators, different indicators than those described, or a combination thereof, may be used in a similar manner to implement a DML that can be operated while maintaining the lock's integrity. An indicator may be relocated to other elements of the DML than the element the indicator has been described in, within the scope of the invention.

The rules described in particular embodiments are only examples and are not intended to limit the scope of the invention. Any rule may be implemented in a manner similar to the rules described in this disclosure within the scope of the invention.

The embodiments of the invention can collaborate with existing lock management applications. The embodiments can also allow existing applications and processes to transparently use DML where they were only configured to use presently used RWLs. Furthermore, during use, DML mode can change while the applications and processes using the DML remain unaware of such transitions.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for retooling lock interfaces for using a dual mode reader writer lock (DML), the computer implemented method comprising:
    receiving an invocation of a method using an interface, the method configured to operate on a lock associated with a resource in a data processing system;
    determining whether the lock is an upgraded lock, the upgraded lock being the DML operating in an upgraded mode, wherein the DML comprises an original lock and a set of expanded lock elements such that write access to the resource is acquired, held, and released using the original lock and the read access is acquired, held, and released using one of (i) the original lock and (ii) an expanded lock in the set of expanded locks, wherein a read-mode indicator in the original lock is set to a first value when the dual mode reader writer lock is used to manage read access only and the read-mode indicator in the original lock is set to a second value when the dual mode reader writer lock is used to manage a read access as well as a write access, the original lock maintaining an index of expanded lock elements in the set of expanded lock elements, modes of operation of the DML comprising a first mode of operating by using only the original lock as a reader writer lock (RWL) and a second mode of operating by using a combination of the original lock and at least one expanded lock element from the set of expanded lock elements, and wherein the first mode is indicated by setting an indicator in the original lock to a first value and the second mode is indicated by setting the indicator in the original lock to a second value; and
    executing, responsive to the lock being the upgraded lock, an operation on the DML corresponding to the method.

2. The computer implemented method of claim 1, further comprising:
    managing, responsive to the lock being the upgraded lock, one of (i) an expanded indicator, (ii) an expandable indicator, and (iii) the index of expanded lock elements in the DML.

3. The computer implemented method of claim 1, further comprising:
    upgrading, responsive to the lock not being the upgraded lock, the lock to the upgraded lock.

4. The computer implemented method of claim 1, wherein the interface is first configured to invoke a second method, the second method being configured to operate on a RWL, and wherein the interface is second configured to invoke the method, the method being configured to operate on the upgraded lock.

5. The computer implemented method of claim 1, wherein the interface is previously unknown for operating the lock, and the interface is configured to invoke the method, the method being configured to operate on the upgraded lock.

6. The computer implemented method of claim 1, wherein the method is implemented using a high level programming language and a low level programming language.

7. The computer implemented method of claim 6, where a portion implemented using the high level programming language implements the operation on the upgraded lock.

8. A computer usable program product comprising a non-transitory computer usable storage medium including computer usable code for retooling lock interfaces for using a dual mode reader writer lock (DML), the computer usable code comprising:
    computer usable code for receiving an invocation of a method using an interface, the method configured to operate on a lock associated with a resource in a data processing system;
    computer usable code for determining whether the lock is an upgraded lock, the upgraded lock being the DML operating in an upgraded mode, wherein the DML comprises an original lock and a set of expanded lock elements such that write access to the resource is acquired, held, and released using the original lock and the read access is acquired, held, and released using one of (i) the original lock and (ii) an expanded lock in the set of expanded locks, wherein a read-mode indicator in the original lock is set to a first value when the dual mode reader writer lock is used to manage read access only and the read-mode indicator in the original lock is set to a second value when the dual mode reader writer lock is used to manage a read access as well as a write access, the original lock maintaining an index of expanded lock elements in the set of expanded lock elements, modes of operation of the DML comprising a first mode of operating by using only the original lock as a reader writer lock (RWL) and a second mode of operating by using a combination of the original lock and at least one expanded lock element from the set of expanded lock elements, and wherein the first mode is indicated by setting an indicator in the original lock to a first value and the second mode is indicated by setting the indicator in the original lock to a second value; and
    computer usable code for executing, responsive to the lock being the upgraded lock, an operation on the DML corresponding to the method.

9. The computer usable program product of claim 8, further comprising:
    computer usable code for managing, responsive to the lock being the upgraded lock, one of (i) an expanded indicator, (ii) an expandable indicator, and (iii) the index of expanded lock elements in the DML.

10. The computer usable program product of claim 8, further comprising:

computer usable code for upgrading, responsive to the lock not being the upgraded lock, the lock to the upgraded lock.

11. The computer usable program product of claim 8, wherein the interface is first configured to invoke a second method, the second method being configured to operate on a RWL, and wherein the interface is second configured to invoke the method, the method being configured to operate on the upgraded lock.

12. The computer usable program product of claim 8, wherein the interface is previously unknown for operating the lock, and the interface is configured to invoke the method, the method being configured to operate on the upgraded lock.

13. The computer usable program product of claim 8, wherein the method is implemented using a high level programming language and a low level programming language.

14. The computer usable program product of claim 13, where a portion implemented using the high level programming language implements the operation on the upgraded lock.

15. The computer usable program product of claim 8, wherein the computer usable code is stored in a computer readable storage medium in a data processing system, and wherein the computer usable code is transferred over a network from a remote data processing system.

16. The computer usable program product of claim 8, wherein the computer usable code is stored in a computer readable storage medium in a server data processing system, and wherein the computer usable code is downloaded over a network to a remote data processing system for use in a computer readable storage medium associated with the remote data processing system.

17. A data processing system for retooling lock interfaces for using a dual mode reader writer lock (DML), the data processing system comprising:

a storage device including a storage medium, wherein the storage device stores computer usable program code; and a processor, wherein the processor executes the computer usable program code, and wherein the computer usable program code comprises:

computer usable code for receiving an invocation of a method using an interface, the method configured to operate on a lock associated with a resource in the data processing system;

computer usable code for determining whether the lock is an upgraded lock, the upgraded lock being the DML operating in an upgraded mode, wherein the DML comprises an original lock and a set of expanded lock elements such that write access to the resource is acquired, held, and released using the original lock and the read access is acquired, held, and released using one of (i) the original lock and (ii) an expanded lock in the set of expanded locks, wherein a read-mode indicator in the original lock is set to a first value when the dual mode reader writer lock is used to manage read access only and the read-mode indicator in the original lock is set to a second value when the dual mode reader writer lock is used to manage a read access as well as a write access, the original lock maintaining an index of expanded lock elements in the set of expanded lock elements, modes of operation of the DML comprising a first mode of operating by using only the original lock as a reader writer lock (RWL) and a second mode of operating by using a combination of the original lock and at least one expanded lock element from the set of expanded lock elements, and wherein the first mode is indicated by setting an indicator in the original lock to a first value and the second mode is indicated by setting the indicator in the original lock to a second value; and computer usable code for executing, responsive to the lock being the upgraded lock, an operation on the DML corresponding to the method.

18. The data processing system of claim 17, further comprising:

computer usable code for managing, responsive to the lock being the upgraded lock, one of (i) an expanded indicator, (ii) an expandable indicator, and (iii) the index of expanded lock elements in the DML.

19. The data processing system of claim 17, further comprising:

computer usable code for upgrading, responsive to the lock not being the upgraded lock, the lock to the upgraded lock.

20. The data processing system of claim 17, wherein the interface is first configured to invoke a second method, the second method being configured to operate on a RWL, and wherein the interface is second configured to invoke the method, the method being configured to operate on the upgraded lock.

* * * * *